(No Model.)
A. HOBERECHT.
CONDENSER.
No. 585,033. Patented June 22, 1897.
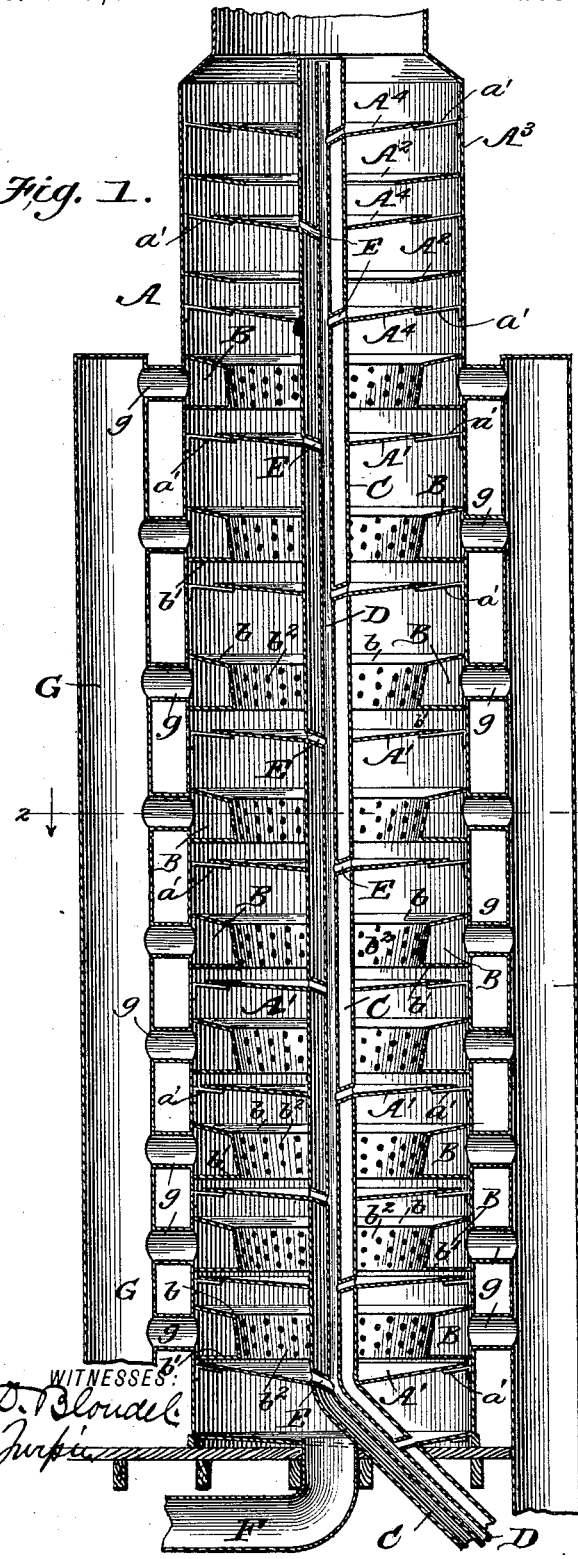
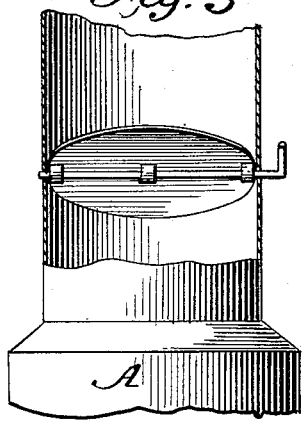
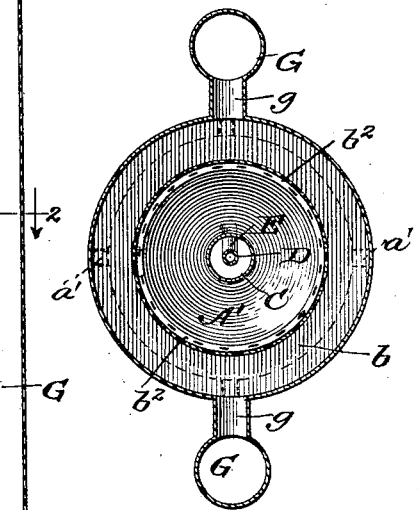
WITNESSES:
INVENTOR
Albert Hoberecht.
BY Munn & Co.
ATTORNEYS.

UNITED STATES PATENT OFFICE.

ALBERT HOBERECHT, OF ENSENADA, MEXICO.

CONDENSER.

SPECIFICATION forming part of Letters Patent No. 585,033, dated June 22, 1897.

Application filed March 28, 1896. Serial No. 585,247. (No model.)

*To all whom it may concern:*

Be it known that I, ALBERT HOBERECHT, residing at Ensenada, Republic of Mexico, have invented a new and useful Improvement in Condensers, of which the following is a specification.

My invention is an improved condenser applicable to all kinds of locomotives, traction, portable, and stationary engines, steam-generators, distilleries, and other apparatus wherein it is desired to condense steam or other vapors; and the invention consists in certain novel constructions and combinations of parts, as will be hereinafter described, and pointed out in the claims.

In the drawings, Figure 1 is a vertical longitudinal section of a condenser constructed according to my invention. Fig. 2 is a cross-section on about line 2 2 of Fig. 1, and Fig. 3 is a detail view showing the stack and the damper therein.

The body A of the condenser has its condensing-space divided into sections by the baffle-plates A', with an annular perforated air-chamber B in each section, and is provided with the central cold-air flue C, the water offtake D, and the baffle-plates $A^4$, arranged in the upper extension $A^3$ of the body A, such baffle-plates $A^4$ coöperating with annular baffles $A^2$, arranged as shown most clearly in Fig. 1.

While the invention may be embodied in an apparatus including a single set of air-chambers B and baffle-plate A', it is preferred in practice to employ a plurality of series of such parts and to construct them relatively and arrange them as shown in Fig. 1.

The cooling or air chambers B are in structure alike and are composed of a top plate $b$, a lower plate $b'$, and a perforated portion $b^2$. This perforated portion $b^2$ extends between the plates $b$ $b'$ and preferably slopes or inclines inward toward its lower end in the shape of an inverted truncated cone, and the plate $b$ is dished toward the center. Between the cooling or air chambers I arrange baffle-plates A' to receive the moisture condensed, as will be understood from Fig. 1. By preference the baffle-plates extend outward nearly to the walls of the body A to cause the vapors to travel in their circuitous passage out to such body, as indicated by the arrows.

It will be noticed from Fig. 1 that the sections or spaces between the baffle-plates A' are not of the same size, but gradually increase in size from the inlet end of the condenser toward the discharge end, thus furnishing an increased condensing-space in each successive condensing-section from the inlet to the outlet end or discharge. The purpose of this relative construction or size is to furnish greater condensing action upon the vapors as they proceed through the condenser, inasmuch as the vapors when they first enter the condenser will not require so much cooling to secure a condensing action as when they have proceeded partly through the condenser and have become partially cool. Therefore I furnish a greater condensing-space toward the discharge end of the condenser than at its inlet end. The cold-air flue C extends centrally within the body A and incloses the water-offtake D, and connecting tubes E lead from the inner lower ends of the dished baffle-plates A' $A^4$ into the cold-air flue C and connect with the water-offtake D, which may lead to the hot-water well or elsewhere, as may be desired. This central air-flue C is desirable because it prevents the condensed liquid in the offtake from becoming heated as it passes out of the condenser, and also aids in the condensing operation by furnishing a cold-air supply centrally within the condensing-body.

The exhaust steam or vapor is supplied to a pipe F, which communicates with the lower end of the condensing-body, whence the vapor circulates upward through the several condensing-chambers and around the baffle-plates before described.

One or more air pipes or flues G, preferably two, as shown, extend alongside the condensing-body and are provided with branch pipes or connections $g$, one for each cooling-chamber, and arranged to open into the body A at points directly opposite the perforated portions $b^2$ of the cooling-chamber. At their upper ends the air-flues G connect by their branch connections $g$ with a cooling-chamber which is located in the lower end of the upper extension A³ of the body A.

The plates b b' may be soldered or otherwise secured to the body of the condenser, and the baffle-plates are usually soldered to the central air-flue and secured by lugs a' to the body of the condenser, but manifestly such baffle-plates may be secured in any suitable manner.

In operation the vapor is supplied to the lower end of the condenser and cold air is led into the pipes C and G and the condensing operation proceeds, as will be understood from the foregoing description. It will be understood that my invention will result in the saving of the water now passing off in exhaust and will permit its use over and over, thereby not only avoiding the waste of water, but also keeping mud, scale, and all foreign matter out of the steam generator or boiler.

The damper as shown in Fig. 3 and arranged in the stack may be utilized to control and regulate the passage of the vapors through the apparatus.

Having thus described my invention, what I claim, and desire to secure by Letters Patent, is—

1. A condenser having a cooling-chamber, a central water-offtake pipe, a baffle-plate and a connection between said plate and the offtake-pipe, such pipe being extended longitudinally through the condenser substantially as shown and described.

2. A condenser comprising the body the water-offtake therein, the cooling and condensing chambers in said body, the baffle-plates and means whereby each of the baffle-plates discharge directly into the offtake substantially as shown and described.

3. A condenser comprising the cooling-chamber having a perforated portion, the baffle-plate, the water-offtake pipe extended through the condenser and connections between the baffle-plate and said offtake-pipe, substantially as shown and described.

4. A condenser comprising the body, the water-offtake the cooling and condensing chambers in said body surrounding said offtake, the baffle-plates surrounding and dipping toward said offtake and connections between the baffle-plates and offtake, substantially as shown and described.

5. A condenser, comprising the body, the water-offtake therein, an air-pipe surrounding said offtake, the cooling-chambers, the baffle-plates and connections between said plates and the offtake, substantially as set forth.

6. In a condenser the combination of the body having the condensing-spaces, the offtake-pipe receiving the condensation and the cooling-tube surrounding said offtake-pipe such tube and pipe being both located in the condensing-space substantially as set forth.

7. The combination of the body or casing, the central offtake, an air-pipe surrounding the same, the cooling-chambers and baffle-plates arranged in said body or casing, the air tube or tubes extending along the outer side of the body or casing and connections leading from said air-tube to the cooling-chambers, substantially as shown and described.

8. In a condenser the combination of the condensing devices, the offtake-pipe receiving the condensation therefrom and a cooling-tube surrounding said offtake-pipe, such pipe and tube being located in the condensing-spaces substantially as shown and described.

9. In a condenser the combination of the body and stack, the cooling-chambers in the body, the central offtake-pipe extending through said cooling-chambers, means whereby the condensation may be discharged into said offtake-pipe and the damper in the stack substantially as shown and described.

10. The condenser herein described comprising the body, the central air-flue, the water-offtake extending through said flue, the cooling-chambers in said body surrounding said central air-flue the lateral air flue or flues connected with the cooling-chambers, the baffle-plates and the connections leading from the baffle-plates into the central air-flue and connecting with the water-offtake, substantially as shown and described.

11. The combination in a condenser of the body, the stack, the cooling-chambers in the body, the central offtake-pipe extended through said chambers, the cooling-tube surrounding said offtake-pipe, the baffle-plates discharging into the offtake-pipe and the damper in the stack substantially as shown and described.

12. The condenser herein described consisting of the upright body having a vapor-inlet at its lower end and the stack at its upper end, the cold-air tube or flue extending centrally through said body, the water-offtake arranged within said air-flue, the cooling-chambers in said body surrounding the central air-flue and having perforated portions, the baffle-plates connected with the water-offtake, the baffle-plates in the body above the cooling-chambers and also connected with the water-offtake and the lateral air tubes or flues extending alongside the body and connected with the cooling-chambers, substantially as shown and described.

ALBERT HOBERECHT.

Witnesses:
E. H. DICKASON,
ARTHUR WEBER.